April 8, 1930.  F. WELLER  1,753,814
TRAP
Filed July 9, 1928
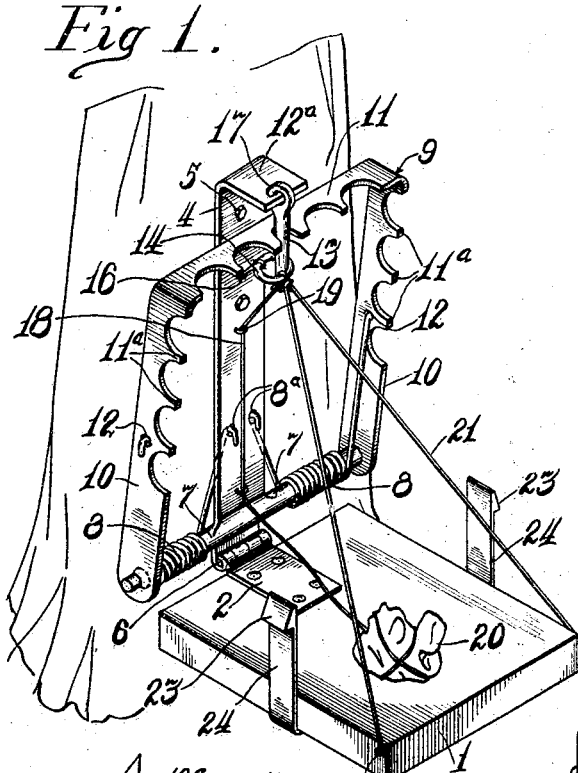
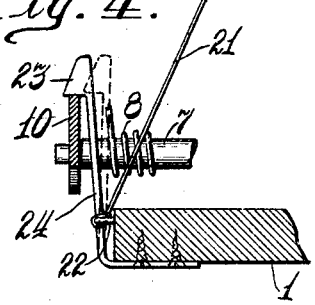
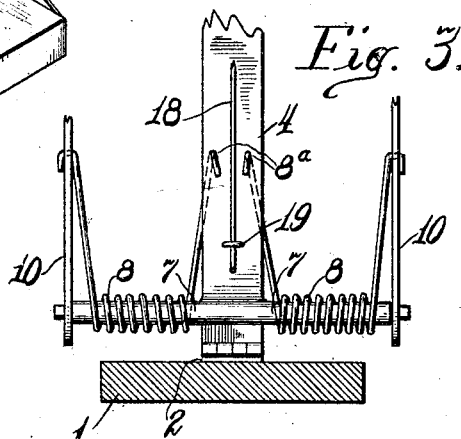
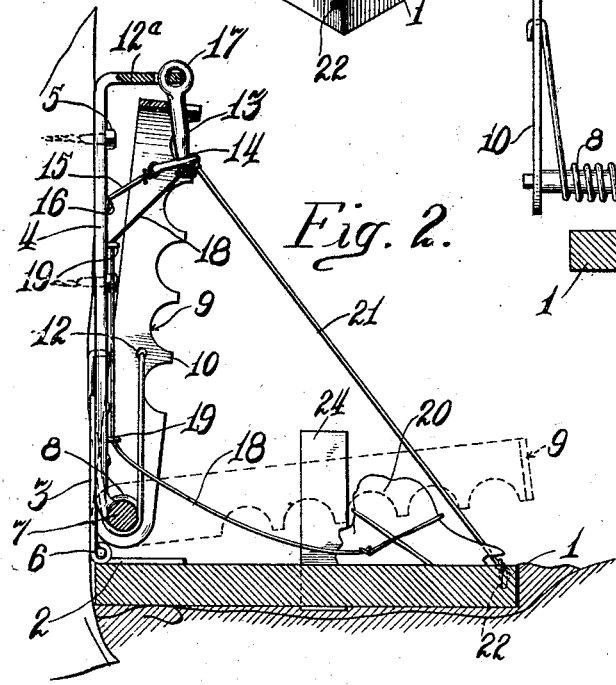
Inventor
Fritz Weller Patented Apr. 8, 1930

1,753,814

UNITED STATES PATENT OFFICE

FRITZ WELLER, OF BONN, GERMANY, ASSIGNOR TO PAUL VON DEY, OF CHICAGO, ILLINOIS

TRAP

Application filed July 9, 1928, Serial No. 291,211, and in Germany September 9, 1927.

This invention relates to improvements in traps.

It is an object of the invention to provide a trap suitable for trapping larger animals and adapted to kill the animal instead of retaining it or merely amputating a leg as in some of the traps used at the present time.

It is also an object of the invention to provide a trap which lends itself properly to concealment in shrubs or the like, and which also is adapted to be secured in its position to prevent the trap from being dragged away from its place by a wounded animal.

The invention, furthermore, has the object of providing a trap which may be sprung by the animal while approaching the bait and even before grasping the bait itself.

It is, furthermore, an object of the invention to provide a trap with a striker element adapted to come down with great force upon the animal and holding said striker element against accidental release by the animal after the trap has once been sprung.

With these and numerous other objects in view, an embodiment of the invention is illustrated in the accompanying drawings, in which:

Fig. 1 is a perspective view of the trap in baited position;

Fig. 2 is a vertical section thru the same;

Fig. 3 shows a fragmentary transverse section through portions of the trap, and

Fig. 4 also is a detail sectional view of certain parts of the trap.

A base or board 1 serves for receiving the bait which may be placed thereon, and is provided with a hinge, one blade 2 of which is secured to a surface of the board 1 while the other hinge blade 3 is fixedly attached to a supporting part 4 by means of which the entire device may be secured to a fixed upright member, as for instance to a tree, as indicated in the drawing. The attachment of the supporting member 4 to the tree or the like may be effected either by screws or similar attachment means 5 extending through suitable openings in the supporting member 4, or the supporting member may be temporarily secured to the tree by stout ropes or the like encircling the tree and the supporting member.

The lower part of the supporting member 4 which is located above the pintle 6 of the hinge has lateral extensions 7 projecting to opposite sides therefrom and enclosed by strong helical springs 8, the inner ends of which are anchored to the supporting member 4, as for instance by being inserted through openings 8, while the outer ends of the springs are secured to a striker element 9 which is pivotally mounted on the ends of the extensions 7 of the supporting member 4. The striker element is bail shaped having the two legs 10 and the transverse part 11, the edges of these portions of the striker element 9 being provided with suitable teeth, as indicated at 11. The legs 10 have at considerable distance from their pivotal support openings 12 in which the outer ends of the springs 7 are inserted, and are anchored therein by bending over the projecting portions of these springs, as shown in Figs. 1 and 3.

The springs 8 on the lateral extensions 7 of the supporting member are anchored in such manner that upon turning the striker element from the position shown in dotted lines in Fig. 2 to the position illustrated in full lines in Figs. 1 and 2, a very strong tension is applied to said springs, which, therefore, have the tendency to throw the striker element 9 violently back to the dotted line position of Fig. 2.

In order to maintain the trap in set position, the supporting member 4 has a top projection 12ª from which a tapering pin 13 is loosely suspended. Near the free end of said pin, it is provided with a notch, while the upper portion of this pin is engaged by the striker element, when the latter is set. The pin, however, prevents the trap from being sprung, owing to the provision of a catch ring 14 which is flexibly secured, as for instance by a wire 15 to a rivet or staple 16 fixedly inserted into the supporting bar 4. It is obvious, therefore, that a release or springing movement of the trap can be effected only upon withdrawal of the catch ring 14 from the locking pin 13, the latter being very loosely supported by means of an eye 17 interlinked with a projection 12ª of the supporting bar.

The means for springing the trap are attached to the catch ring 14 and may comprise a thin, flexible element as a thread or horsehair 18 attached at one end to the ring 14 and guided through eyes or staples 19 which are driven into the supporting bar. The lower end of the thread or horsehair 18 rests on the board 1, and to this free end of the thread the bait 20 may be secured in a suitable way.

In order to trap the approaching animal if it should come close to the trap from the sides of the same instead of from the front, similar catch releasing elements of flexible character extend from the board 1 to the catch ring 14. These additional flexible elements in the form of threads or horsehairs 21 are also secured at one end to the ring 14 while the other end thereof is attached to eyes or screws 22 projecting laterally from the edge of the board 1.

Larger animals which might be caught under the striker element without being immediately killed by the same might eventually wriggle out from under the strike element 9, and in order to prevent this escape of the animal, means are provided which prevent the return movement of the striker element after the trip has once been sprung. For this purpose hooks 23 are secured to resilient bars 24 which are fastened to the board 1 and which project into the path of the legs 10 of the striker element, so that upon springing the trap, said legs will force the hooks 23 inward towards the dotted line position shown in Fig. 4 upon the rapid descent of the striker element. Since the bars 24 are formed as yielding or spring blades which immediately after the passage of the striker element, return again to their full line position shown in Fig. 4, they catch the striker element and prevent the return of the same or the release of the striker element which would make an escape of the animal possible.

In the operation of the device, the supporting bar 4 is secured to a fixed upright structure or tree or the like, and the board 1 is placed on the ground in such manner that its front portion may be slightly depressed by an animal stepping on the same. It may be advisable to put a rigid support under the rear portion of the board 1 while flexible substances as moss, grass or the like are secured under the remainder of said board. The striker element is then swung from the position shown in dotted lines in Fig. 2 to full line position after the trap has been baited by attaching the bait 20 to the flexible element 18. The striker element is maintained in its raised or set position by bringing the ring 14 into engagement with the notch of the holding pin 13. The tendency of the striker element to return to sprung position will then merely place a strain on the flexible connecting element 15 between the catch 14 and the supporting member 4 without, however, straining this connecting wire 15 beyond the limits.

If an animal without stepping on the board 1 tries to remove the bait 20, it will exert a tension on the thread or horsehair 18, thereby releasing the catch 14, so that the striker is thrown with great violence through the action of the strong springs 8 in direction towards the board 1 to kill the animal by breaking its backbone. Some larger game animals, having the habit of encircling the bait several times and then warily approaching the same at an angle, will be similarly caught by merely stepping on the board 1 since the movement of the board about the hinge pintle 6 will place sufficient tension on the flexible elements 21 to cause the release of the catch 14 from the pin 13, again springing the trap.

The trap is primarily intended for catching larger wild animals and has the advantage of outright killing the game, while in most of the ordinary game traps in use two members are snapped towards each other when the trap is being sprung, thereby usually catching the animal at a leg and frequently enabling the animal to escape sometimes after it has amputated the leg.

In raising the striker 9 from the dotted line position in Fig. 2 to the full line position, the operator merely has to force the spring blades 24 inward, whereby the legs 10 of the striker are permitted to pass the hooks 23 on the outside thereof.

I claim:

1. In a device of the character described, the combination of a base, an upright support hingedly connected with said base, a pin loosely suspended from the upper end of said support, a striking element under the control of springs and pivotally associated with said support, the pin being adapted to obstruct the path of the striking element to hold it in raised position, and a plurality of flexible means each of which is adapted for moving the suspended pin out of the path of said spring controlled striking element.

2. In a device of the character described, the combination of a base, a support hingedly connected to the base and having lateral projections integral therewith, springs wound about said projections and anchored at one end to said support, a striking element pivoted to said lateral extensions, the other ends of said springs being anchored in said striking element, a locking element freely suspended from the support, means for holding said locking element in the path of said striking element, and flexible means on the board for releasing said holding means for the locking pin from holding position.

3. In a device of the character described, the combination of a board, a supporting bar pivotally connected therewith and having lateral extensions, a striker element pivoted to said supporting bar, springs, the striker element being under control of the springs interposed between said element and the bar, a locking pin loosely suspended from said supporting bar, means for retaining said locking pin in the path of the striker element, and a plurality of flexible elements secured to the board for releasing said pin holding means.

4. In a device of the character described, a board, a supporting bar pivotally associated with the board, a striker element under control of springs associated with said supporting bar, means for normally retaining said striker element in inoperative position, and flexible members extending from said retaining means to said board adapted to release said retaining means upon movement of said board in one direction relative to the supporting bar.

In witness whereof I affix my signature.

FRITZ WELLER.